United States Patent [19]

Weigl

[11] 4,164,872
[45] Aug. 21, 1979

[54] METHOD FOR DETERMINING SPINNING OR SLIPPING OF THE WHEELS IN PROPULSION VEHICLES WITHOUT DEAD AXLES

[75] Inventor: Karlheinz Weigl, Erlangen, Fed. Rep. of Germany

[73] Assignee: Siemens Aktiengesellschaft, Munich, Fed. Rep. of Germany

[21] Appl. No.: 874,556

[22] Filed: Feb. 2, 1978

[30] Foreign Application Priority Data

Feb. 18, 1977 [DE] Fed. Rep. of Germany ....... 2707047

[51] Int. Cl.² .......................... G01P 3/50; B61C 15/08
[52] U.S. Cl. ..................................... 73/510; 180/197; 303/96; 318/52; 324/161
[58] Field of Search .................. 73/510; 324/161, 178; 303/93, 96, 102, 107, 108, 109, 97, 106; 318/52; 180/82 R

[56] References Cited

U.S. PATENT DOCUMENTS 3,912,034  10/1975  Palloff .................................. 303/96 X
4,032,197   6/1977  Kohler .................................. 303/96

Primary Examiner—James J. Gill
Attorney, Agent, or Firm—Kenyon & Kenyon

[57] ABSTRACT

A method for determining the spinning or slipping of the wheels in propulsion vehicles without dead axles, particularly railroad vehicles in which: the highest and the lowest wheel velocity of the measured wheel velocities of all axles is determined; the highest wheel velocity is selected in the presence of a braking command, and otherwise, the lowest wheel velocity is selected; a simulated car velocity is determined from the selected wheel velocity taking accelerating or decelerating influence variables into consideration; and the simulated car velocity is compared with the measured wheel velocities and the differences that result are converted into signals for influencing the drive or the braking device of the respective axle.

8 Claims, 2 Drawing Figures

METHOD FOR DETERMINING SPINNING OR SLIPPING OF THE WHEELS IN PROPULSION VEHICLES WITHOUT DEAD AXLES

BACKGROUND OF THE INVENTION

This invention relates to propulsion vehicles in general and more particularly to a method for determining spinning or slipping of wheels in propulsion vehicles without dead axles.

In rail vehicles, rotation of the wheels without frictionally secured rolling is to be avoided. In starting, this type of rotation is called spinning and, in braking, slipping. Spinning and slipping of the wheels can come about if the individual drive or braking steps are selected in too rapid a sequence, if the friction coefficient between the wheel and its support is reduced due to fallen leaves, moisture or ice formation on the track surface, or, in the case of bogie locomotives, if the phenomenon of axle pressure displacement occurs. It is desirable to indicate spinning or slipping by means of a signaling device and to utilize it, preferably in an automatic control, for correcting the drive power.

For determining spinning or slipping of the drive wheels of railroad vehicles it is known to attach a tachometer generator to each dead or driving axle and to connect the voltages of the tachometer generators, in series bucking, to the coil of a relay. In the case of spinning or slipping, a difference between the speeds of the dead axle and the driving axle appears. The voltage difference between the bucking tachometer generators energizes the relay, the contacts of which interrupt the circuit of the drive motor.

However, devices of this known type are basically not suitable for many modern rail vehicles such as long distance and local railroads, trolley cars and self-propelled Diesel cars, if such vehicles have exclusively driving axles or driving axles, plus mechanically braked axles, but no plain dead axles. The actual vehicle velocity can be determined reliably only on a plain dead axle.

From the German Pat. No. 11 78 899, a method for determining spinning or slipping of drive wheels in rail vehicles without dead axles is known, in which the acceleration of the driven wheels as well as the acceleration of the vehicle is determined. Differences between the accelerations of the drive wheel and the vehicle are evaluated as spinning or slipping signals. In this known method, it is a disadvantage that both a measuring transducer for the wheel acceleration and a measuring transducer for the linear acceleration of the vehicle are necessary. While the measuring transducer for the drive wheel acceleration can simply consist of a tachometer generator driven by the drive wheel, having its output conducted through a differentiating member, a linear accelerometer working according to the inertia principle and which contains an elaborate seismic system, is necessary as the acceleration transducer for the vehicle velocity.

SUMMARY OF THE INVENTION

It is an object of the present invention to describe a method for determining spinning or slipping of the wheels in propulsion vehicles without dead axles, which works exclusively with electrical or electronic means.

According to the present invention, the following features are provided for this purpose:

(a) of the measured wheel velocities of all axles, the highest or the lowest wheel velocity is determined and, in the presence of a braking command, the highest wheel velocity is selected, and otherwise, the lowest wheel velocity is selected.
(b) from the selected wheel velocity, a simulated vehicle velocity is determined, taking influence variables which cause an acceleration or a deceleration of the vehicle into consideration; and
(c) the simulated vehicle velocity is compared with the measured wheel velocities and occurring differences are converted into signals for influencing the drive or the braking device of the respective axle.

The method according to the present invention is suitable particularly for rail propulsion vehicles in which either all four axles are customarily driving axles or in which three axles are driving axles and two other axles are designed as mechanically braked dead axles. The mechanically braked dead axles oscillate heavily between much slippage and no slippage, due to the action of the friction brake. The speeds of such dead axles with a friction brake are therefore not suitable for evaluation.

In the method according to the present invention, a comparison of the driving axle velocities with the vehicle velocity formed in an electronic model is performed. The electronic model takes into consideration the mass of the vehicle and the measured load, the traction forces, the braking forces of the generator and the mechanical brake, the air and rolling resistance and the inclination and downward slope of the line, if this is necessary. A supplemental force which causes the acceleration of the vehicle mass simulated by the model to always be larger than the acceleration which occurs in reality is preferably further fed to the electronic model. The electronic model can preferably be designed with a further device which insures that the vehicle velocity simulated by the electronic model is never lower in braking operation than the highest axle velocity and, in driving operation, is never higher than the lowest axle velocity.

DETAILED DESCRIPTION OF THE INVENTION

Figure 1:
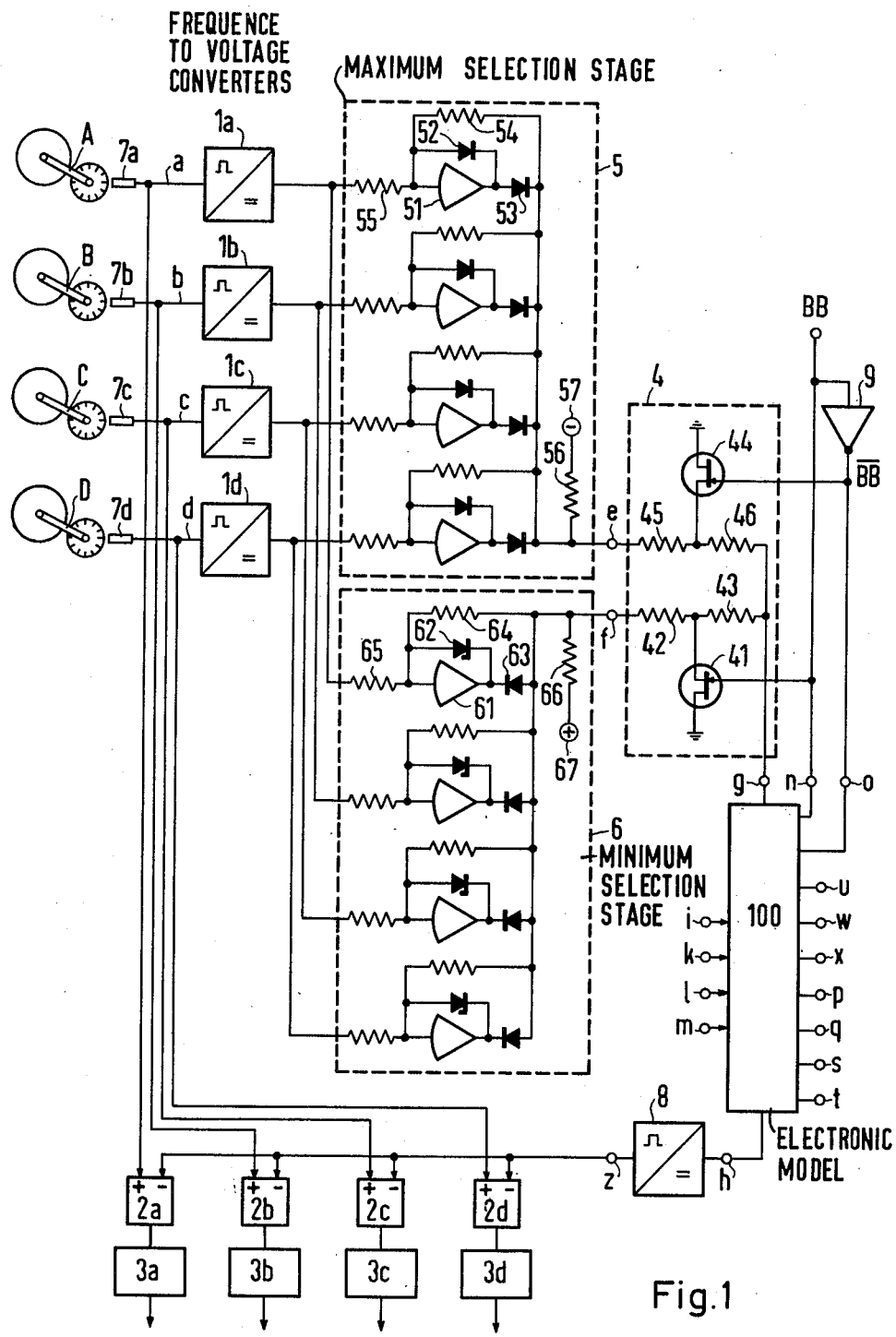
FIG. 1 is a block-circuit diagram of apparatus for implementing the method according to the present invention.

The illustration of FIG. 1 relates to an application, in which a propulsion vehicle is equipped with four axles A, B, C, and D driven by electric motors and no other axles are provided. Axle pulse transmitters 7a, 7b, 7c, 7d are coupled to the respective four axles A, B, C, D. In the illustrated embodiment the transmitters 7a, 7b, 7c, and 7d are angle step transducers. The axle pulse transmitters contain a disc which has a large number of elements at its circumference which can be scanned electrically, magnetically or optically and which generate pulses when passing by a probe. Preferably, these pulses are coupled through pulse shaper stages, not shown. The lines a, b, c, and d are reserved for the axles pulses of the respective axles. The axle pulses are fed to frequency to voltage converters 1a, 1b, 1c, and 1d at the outputs of which voltages which are proportional to the frequencies of the axle pulses of the respective axles appear. Since the diameter of the wheels connected to the axles is known and can be considered as constant, the output voltages of the frequency to voltage converters 1a, 1b, 1c, and 1d represent the wheel velocities of their associated axles. However, it is also possible to use tachometer generators which directly generate voltages which are proportional to the respective wheel velocities for determining the wheel velocities.

The measured wheel velocities of all axles are fed to a maximum selection stage 5 and a minimum selection stage 6. At the output e of the maximum selection stage 5 the voltage which represents the highest wheel velocity appears. This is the wheel velocity of that axle, the wheels of which have the smallest slippage in braking operation. At the output f of the minimum selection stage 6 appears the voltage representing the lowest wheel velocity. This is the wheel velocity of that axle whose wheels spin the least in driving operation.

In a switching circuit 4, which has as inputs the outputs e and f of the maximum selection stage 5 and the minimum selection stage 6, either the highest or the lowest wheel velocity, depending on whether a braking command BB is present or not, is connected through to the input g of an electronic model 100, since the wheel velocity of the wheel with the least slippage comes closest to the vehicle velocity. In braking operation, this is the highest, and for acceleration during the driving operation, the lowest wheel velocity.

The electronic model 100 determines a simulated vehicle velocity from the selected wheel velocity, taking into consideration influence variables which cause acceleration or deceleration of the vehicle. The simulated vehicle velocity which appears at the output h of the model 100 as an analog voltage, is converted into a simulated vehicle velocity pulse sequence in a voltage to frequency converter. The simulated vehicle velocity pulse sequence z is compared in difference gates 2a, 2b, 2c, and 2d with the axle pulse sequences of the axle pulse transmitters 7a, 7b, 7c, and 7d at the axles A, B, C, and D. Occurring differences are converted into signals for influencing the drive or the braking device of the respective axle in slippage controllers 3a, 3b, 3c, and 3d. Such slippage controllers may contain a threshold member, which suppresses small variations of the wheel velocity, the cause of which can usually not be defined and the effect of which need not be taken into consideration. The slippage controllers generate signals, by which the driving torque or the braking torque of the axles in question is reduced if the device determines that the wheels connected to the respective axle spin or slip.

The circuit design of the maximum selection stage 5 can be seen in detail from the circuit diagram and will be described only for the channel for the axle A. The output voltage of the frequency to voltage converter 1a representing the wheel velocity at the axle A is fed via an input resistor 55 to an operational amplifier 51. The latter is shunted by a diode 52 with the forward direction indicated. The output of the operational amplifier 51 is connected to the anode of a further diode 53, the cathode of which is fed back via a resistor 54 to the input of the amplifier 51. The cathode of the diode 53 is connected to the cathodes of similar diodes for the other channels and is connected via a resistor 56 to a negative potential 57. The voltage at the output 3 thus corresponds to the voltage of the respective channel with the highest positive input voltage. The output voltages of the operational amplifiers in the other channels are decoupled and limited to the threshold voltage of the diodes bridging the operational amplifiers, say, to $-0.7$ V.

The circuit design of the minimum selection stage 6 is likewise evident from the drawing and will be described only with respect to the channel for the axle A. The output voltage of the frequency to voltage converter 1a is fed to an operational amplifier 61 via an input resistor 65.

The operational amplifier 61 is shunted by a Zener diode 62. The output of the operational amplifier 61 is connected to the cathode of a diode 63, the anode of which is fed back via a further resistor 64 to the input of the operational amplifier 61. The anode of the diode 63 is connected to the anodes of the similarly connected diodes of the other channels and is connected via a resistor 66 to a positive potential 67. At the output f of the minimum selection circuit 6 there thus appears the voltage in the respective channel with the lowest positive input voltage. The output voltages of the operational amplifiers in the other channels are decoupled and limited to the Zener voltages of the Zener diodes which shunt the operational amplifiers. The Zener voltage of these Zener diodes is chosen lower than the maximum output voltage of the operational amplifiers.

The switching device 4 comprises a first FET transistor 41 between two resistors 42 and 43 as well as a second FET transistor 44 between two resistors 45 and 46. If the first FET transistor 41 is switched into conduction by the braking command BB, it conducts the potential at the output f of the minimum selection stage 6 to ground. Simultaneously, the further FET transistor 44 is switched to cutoff by the inverse braking command $\overline{BB}$, so that the potential at the output e of the maximum selection stage 5 gets to the input g of the electric model 100. The inverse braking command $\overline{BB}$ is formed from the braking command BB by an inverter 9. If no braking command BB is present, the FET transistor 44 is switched into conduction by the inverted braking command $\overline{BB}$ and conducts the potential from the output e of the maximum selection stage 5 to ground. At the same time, the FET transistor 41 is cut off, so that the potential at the output f of the minimum selection stage 6 gets to the input g of the electronic model 100.

The input n of the electronic model 100 is addressed by the braking command BB and the input o of the electronic model M by the inverted braking command $\overline{BB}$.

Figure 2:
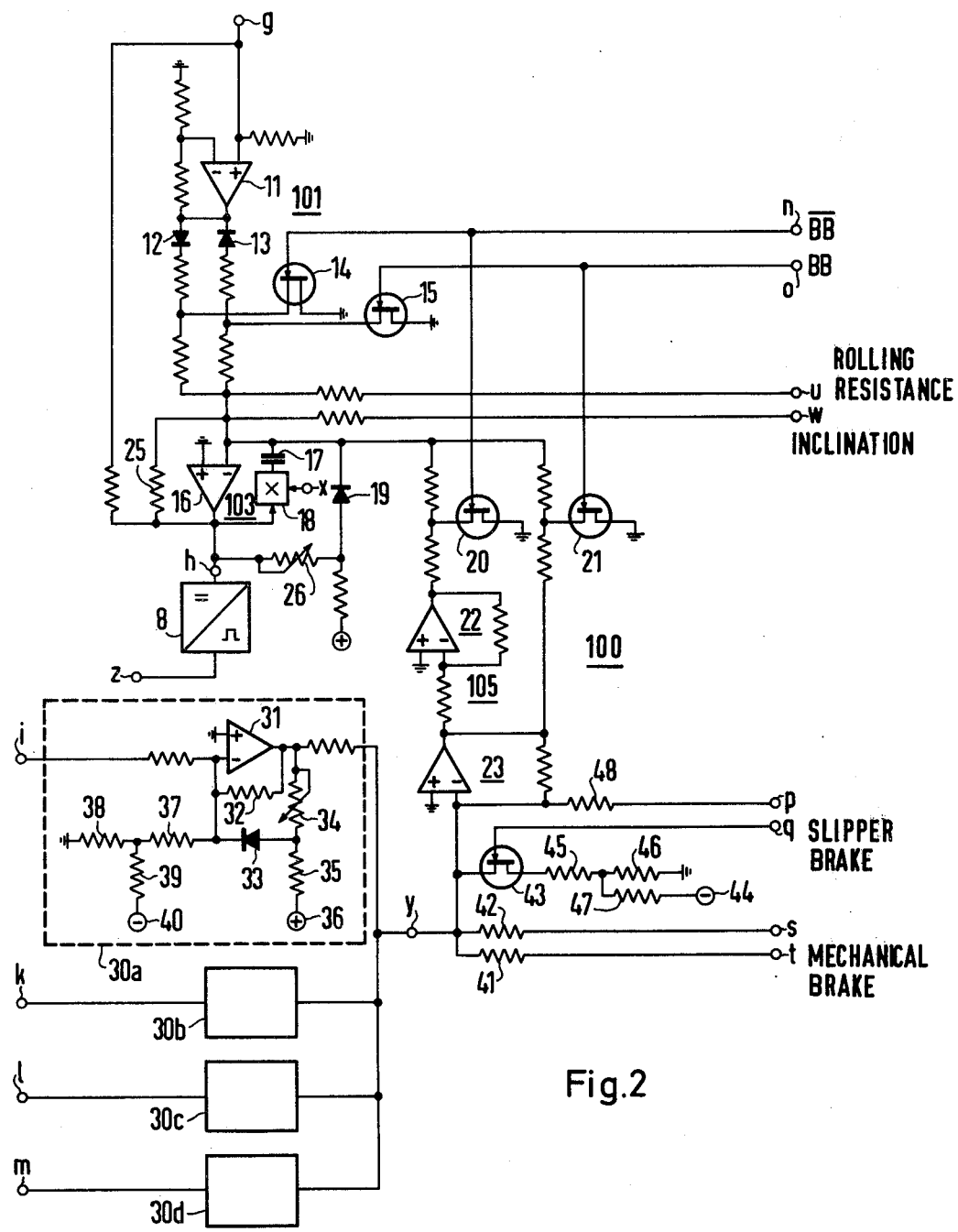
FIG. 2 is a circuit diagram of the electronic model in the apparatus according to FIG. 1.

The design and operation of the electronic model M will now be explained with the aid of FIG. 2.

The voltage which is present at the input g and which represents the selected wheel velocity is fed to a control device 101 which consists of an amplifier 11, the diodes 12 and 13 with the polarity shown, and the electronic switches, which are realized, for instance, by the transistors 14 and 15 and are controlled by the inverted braking command $\overline{BB}$ at the input n and the braking command BB at the input o. The control device 101 is followed by an integrator 103 which contains an amplifier 16, into the feedback path of which a capacitor 17 and a multiplier 18 are connected in series. The output voltage of the integrator at the point h represents the simulated vehicle velocity which is presented as an analog voltage. The simulated vehicle velocity is converted by the voltage to frequency converter 8 into a pulse sequence which is proportional to the vehicle velocity. The pulse sequence appears at the terminal z and is further processed in the manner described in connection with FIG. 1.

At the non-inverting input of the operational amplifier 11 of the control device, the voltage representing the selected wheel velocity is compared with the voltage representing the simulated vehicle velocity. The inverting input of the operational amplifier 11 is connected to ground. Negative output voltages of the operational amplifier 11 are blocked by the diode 12. Positive output voltages of the operational amplifier 11 are blocked by the diode 13. The potential at the cathode of the diode 12 is conducted to ground if the FET transistor 14 is switched into conduction by the inverted braking command BB. The potential at the anode of the diode 13 is conducted to ground by the FET transistor 15, if the latter is switched into conduction by a braking command BB. The control arrangement described insures that the electrically simulated vehicle velocity, in braking operation, never becomes smaller than the highest wheel velocity fed in at the input g and that, in driving operation, the simulated wheel velocity never becomes larger than the lowest vehicle velocity fed in at the input g. In braking operation, the simulated vehicle velocity is therefore never smaller than the wheel velocity of the wheels with the least slippage. In driving operation, the simulated vehicle velocity is never larger than the wheel velocity of the wheels which spin the least.

At the inverting input of the operational amplifier 16 of the integrator a small negative voltage, which is fed in at the terminal u and characterizes the rolling resistance of the propulsion vehicle, is added to the output voltage of the control device 101. At the terminal w, a voltage from an inclination transducer, which indicates the instantaneous inclination of the vehicle and thereby, also of the track is also fed in. If the inclination is upward, the voltage at the terminal w is negative, if a decline, it is negative. The voltages indicating the rolling friction and an upward inclination act in the sense of decelerating the mass of the vehicle, while the voltage indicating a downward slope acts in the sense of accelerating the mass of the vehicle. To the inverting input of the integrator 103 is further fed, at the terminal y, a voltage simulating the sum of all moments acting on the mass of the vehicle, the determination of which will be explained in detail later on. Finally, the effect of the air resistance can also be provided by feeding back the simulated vehicle velocity to the inverting input of the amplifier 16 via a resistor 25.

The integrator 103 is therefore acted upon by an input voltage which is proportional to the sum of the forces which cause acceleration or deceleration of the vehicle mass. Integrating these forces simulates the velocity of the vehicle mass. The capacity of the integration capacitor 17 is chosen in accordance with the known mass of the propulsion vehicle. A voltage which represents the payload of the propulsion vehicle is fed as a multiplication factor to the input terminal x of the multiplier 18. If, for instance, the propulsion vehicle is equipped with air springs, then the pressure in the bellows of the air springs can be measured and converted into a signal which indicates the payload. The integrator 103 is provided with a further feedback which comprises a diode 19 and a variable potentiometer 26 in series. The junction between the diode 19 and the variable potentiometer 26 is connected to a positive potential via a further resistor. This feedback causes a limitation of the output voltage of the integrator and thereby, of the electronically simulated vehicle velocity, since the voltage value to which the output voltage of the operational amplifier 16 is limited, is higher than the voltage for the maximum possible vehicle velocity.

The four input terminals i, k, l, and m of the model 100 receive measured values of the armature currents of the drive motor of the four axles A, B, C, and D. The measured armature currents are brought to function generators 30a, 30b, 30c, and 30d to determine the generator force provided by each drive motor during driving and braking operation. The design of the similarly constructed function generators will be described in connection with the function generator 30a, the circuit of which is shown. The value measured for the armature current of the drive motor for the axle A, which appears at the input terminal i, is fed to the inverting input of an operational amplifier 31, the feedback path of which contains a resistor 32. The output of the operational amplifier 31 is connected via a setting potentiometer 34 and a diode 33 to its inverting input. The junction between the setting potentiometer 34 and the diode 33 is connected via a further resistor 35 to a positive potential 36. The inverting input of the operational amplifier 31 is further connected to ground via the resistors 37 and 38 shown, and to a negative potential 40 via the resistors 37 and 39. The function generators 30a to 30d simulate the relationship between the armature current and the generator force of an electric machine. The output voltages of the function generators 30a to 30d are tied together and form a sum voltage at the terminal y, which represents the total generator force exerted on the vehicle mass by the drives in braking operation and in driving operation.

As a further component which causes deceleration of the vehicle mass, a voltage representing the braking force of a mechanical brake, particularly a wheel brake, is introduced at the terminal t via a resistor 41. The respective voltage is added if the brake in question goes into action. The magnitude of the voltage fed in at the terminal t is preferably proportional to the desired value for the armature current, if the mechanical braking force acting on the braked dead axle can be adjusted by means of the generator braking force.

For simulating a further deceleration component, a voltage which corresponds to the difference between the actual armature current and the desired armature current, is introduced at the terminal s via a resistor 42. This voltage corresponds to the mechanical braking force at the driving axle which occurs if a mechanical brake is provided at the driving axle, which can supplement a generator braking force that may be missing.

To take into account the effect of a slipper brake, a constant negative voltage from a voltage source 44 can be added into the circuit in the circuit shown via a resistor combination with the resistors 45, 46, 47 and an electronic switch 43, e.g., an FET transistor. A control signal at the terminal q switches the electronic switch 43 into conduction when the slipper brake is switched on.

The feeding in of a negative voltage at the terminal p via a resistor 48 is important. This voltage represents a supplemental force which causes the acceleration taken into consideration by the model 100 to always be larger than the acceleration that actually occurs in reality.

A voltage which represents the sum of all moments which cause, as generator forces, an acceleration of the vehicle mass or, as generator and as mechanical braking forces, a deceleration of the vehicle mass is fed to the inverting input of an operational amplifier 23 connected as a linear amplifier. This sum of moments is applied to the input of the integrator 103 via a switching device 105, which is controlled by the braking command BB and the inverting braking command $\overline{BB}$, respectively. To this end, the output of the linear amplifier 23 is connected via an inverting amplifier 22 to the input of the operational amplifier 16 in the integrator. To the output of the inverting amplifier 22 is connected an electronic switch 20, for instance, an FET transister, which can be switched into conduction by the inverted braking command $\overline{BB}$ at the terminal n and then conducts the output voltage of the inverter 22 to ground. The output of the linear amplifier 23 is connected to the inverting input of the operational amplifier 16 of the integrator via further resistors, between which a further electronic switch 21 is connected, which can be made to conduct by the braking command BB at the terminal o and then conducts the output voltage of the linear amplifier 23, i.e., the sum of the moments, is connected with negative sign to the input of the integrator 103. If no braking command is present, the sum of the moments is connected with positive sign to the input of the integrator 103.

What is claimed is:

1. A method for determining spinning and slipping of the wheels in propulsion vehicles without dead axles, particularly rail propulsion vehicles, comprising:
   (a) measuring the wheel velocities of all axles;
   (b) determining the highest and the lowest wheel velocity of the measured wheel velocities of all axles;
   (c) in the presence of a braking command selecting the highest wheel velocity and otherwise selecting the lowest wheel velocity for further use;
   (d) determining a simulated vehicle velocity from the selected wheel velocity, taking into consideration influence variables which cause acceleration or deceleration of the vehicle;
   (e) comparing the simulated vehicle velocity with the measured wheel velocities to determine the differences therebetween; and
   (f) converting the differences that occur into signals for influencing the drive or the braking device of the respective axle.

2. The method of claim 1 wherein, in determining a simulated vehicle velocity from a selected wheel velocity the mass of the vehicle and the measured load, the traction forces, the braking forces of the generator and the mechanical brake, and the air and rolling resistance are taken into consideration as influence variables which cause acceleration or deceleration of the vehicle.

3. The method of claim 2 and further including taking into consideration as an influence variable, the inclination and downward slope of the line.

4. The method of claim 3 and further including, when determining said simulated vehicle velocity, taking into consideration a supplemental force which causes the acceleration of the vehicle mass simulated by the model to always be larger than the acceleration which occurs in reality.

5. Apparatus for determining spinning and slipping of the wheels in propulsion vehicles without dead axles, particularly rail propulsion vehicles, comprising:
   (a) means for measuring the wheel velocities of all axles;
   (b) means for determining the highest and the lowest wheel velocity of the measured wheel velocities of all axles;
   (c) means for selecting the highest wheel velocity in the presence of a braking command and otherwise selecting the lowest wheel velocity for further use;
   (d) means for determining a simulated vehicle velocity from the selected wheel velocity, taking into consideration influence variables which cause acceleration or deceleration of the vehicle;
   (e) means for comparing the simulated vehicle velocity with the measured wheel velocities to determine the differences therebetween; and
   (f) means for converting the differences that occur into signals for influencing the drive or the braking device of the respective axle.

6. Apparatus according to claim 5 wherein said means for determining a simulated vehicle velocity comprises an electronic model having as inputs signals representing the mass of the vehicle and the measured load, the traction forces, the braking forces of the generator and the mechanical brake, and the air and rolling resistance.

7. Apparatus according to claim 6 wherein said electronic model has as a further input a signal representing the inclination and downward slope of the line.

8. Apparatus according to claim 7 wherein said electronic model has as a further input a signal representative of a supplemental force which causes the acceleration of the vehicle mass simulated by the model to always be larger than the acceleration which occurs in reality.

* * * * *